Dec. 29, 1936.  L. H. POMEROY ET AL  2,066,308
BAND BRAKE
Filed Feb. 11, 1935  4 Sheets-Sheet 1

INVENTORS.
Laurence H. Pomeroy,
and Albert V. Oliver,
BY
Gill and Jennings
ATTORNEYS.

Dec. 29, 1936.  L. H. POMEROY ET AL  2,066,308
BAND BRAKE
Filed Feb. 11, 1935    4 Sheets-Sheet 2

INVENTORS.
Lawrence H. Pomeroy
and Albert V. Oliver,
BY
Gill and Jennings
ATTORNEYS Dec. 29, 1936.    L. H. POMEROY ET AL    2,066,308
BAND BRAKE
Filed Feb. 11, 1935    4 Sheets-Sheet 3

INVENTORS.
Laurence H. Pomeroy,
and Albert V. Oliver,
BY
Gill and Jennings,
ATTORNEYS.

Dec. 29, 1936.  L. H. POMEROY ET AL  2,066,308
BAND BRAKE
Filed Feb. 11, 1935  4 Sheets-Sheet 4
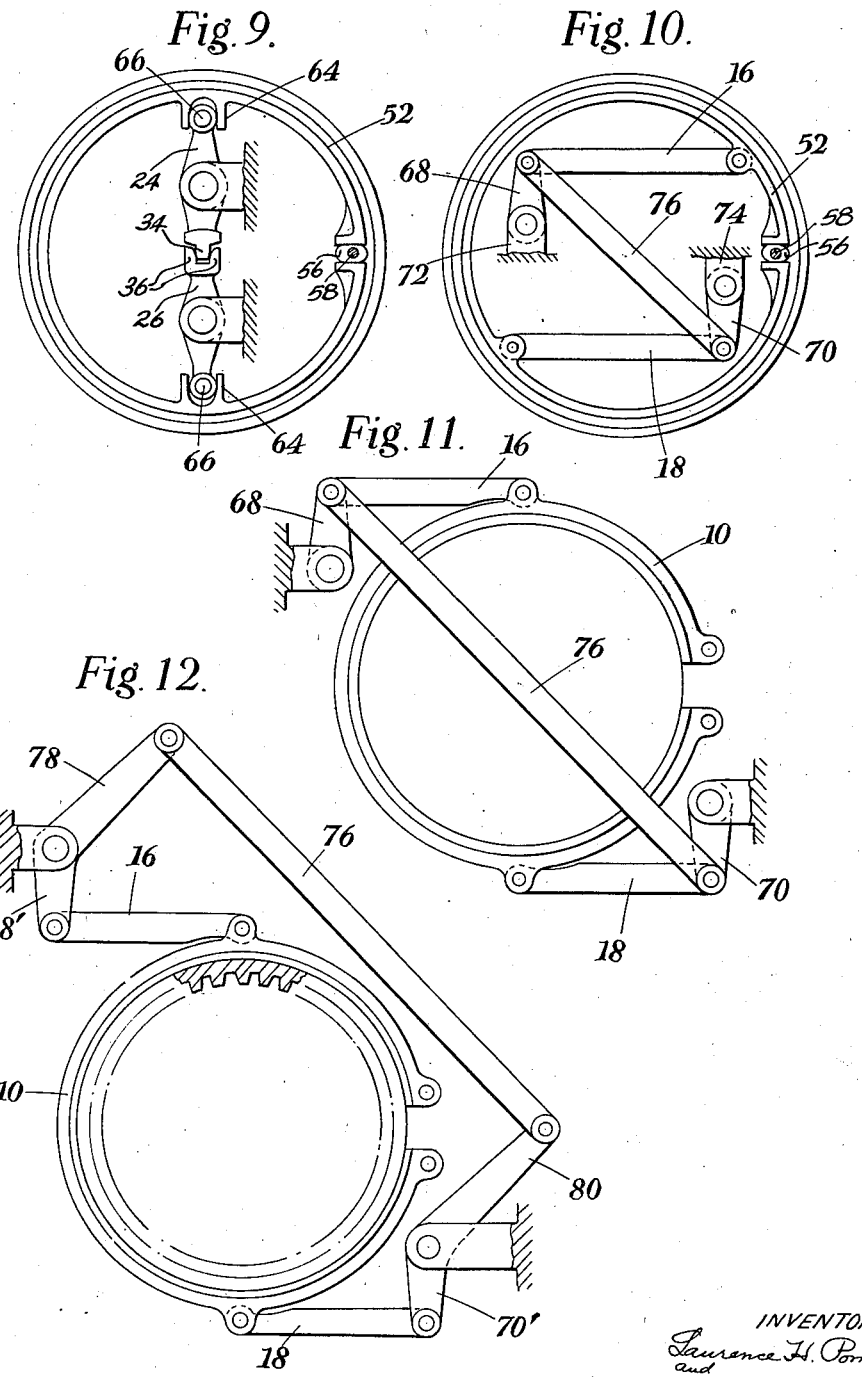
INVENTORS
Laurence H. Pomeroy
and
BY Albert V. Oliver
Gill and Jennings
ATTORNEYS.

Patented Dec. 29, 1936

2,066,308

UNITED STATES PATENT OFFICE 2,066,308

BAND BRAKE

Laurence Henry Pomeroy, Leamington, and Albert Vere Oliver, Coventry, England, assignors to The Daimler Company Limited, Coventry, England, a British company Application February 11, 1935, Serial No. 6,020
In Great Britain July 26, 1933

14 Claims. (Cl. 188—77)

This invention relates to means for supporting and actuating band brakes, and its object is to provide means whereby the application of the band brake shall cause as little stress on the brake-drum transverse to its axis as may be desired.

According to this invention a brake-band which encircles the whole or nearly the whole of the circumference of the brake-drum, whether externally or internally, is connected to an anchorage at two separate points spaced around the band by a balance device which prevents said points from moving in opposite senses transversely to the line joining them but does not restrain said points from moving in the same sense in any direction.

The balance device may consist of two balance levers each pivoted at a point between its ends to a fixed anchorage, connected together so that they are constrained to swing in opposite senses and connected individually, for example by means of links or pin and slot devices, to the two points on the brake-band.

If it is desired that there shall be no transverse reaction whatever on the brake-drum the velocity ratio of the balance device should be appropriate to the distances from the axis of the drum of the two points of connection of the balance device to the brake-band. In most cases these distances are equal and the balance device has unit velocity ratio. When links are used to connect the balance device to the brake-band these links must be parallel to one another in order that there shall be no radial reaction.

Figure 1:
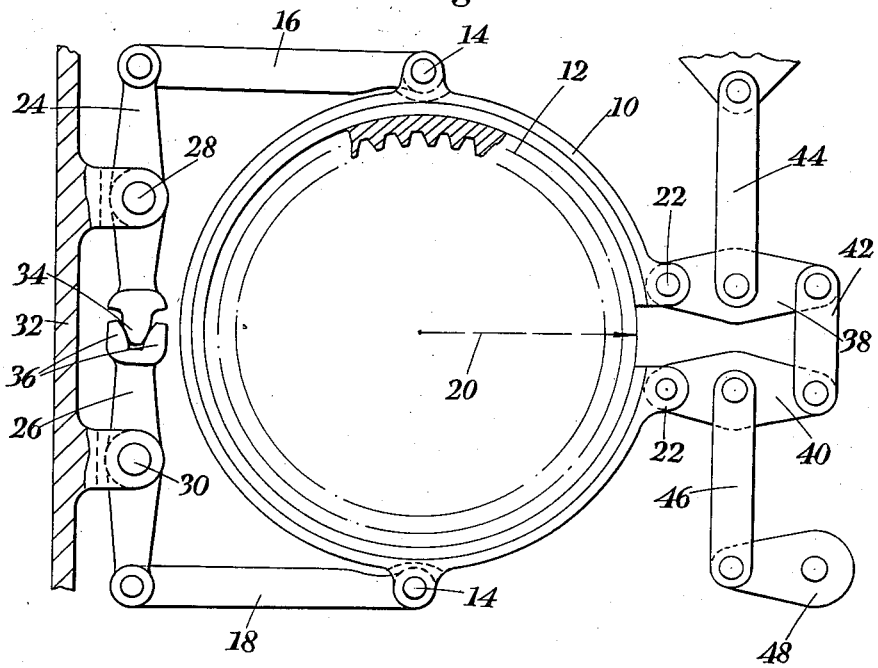
Figure 2:
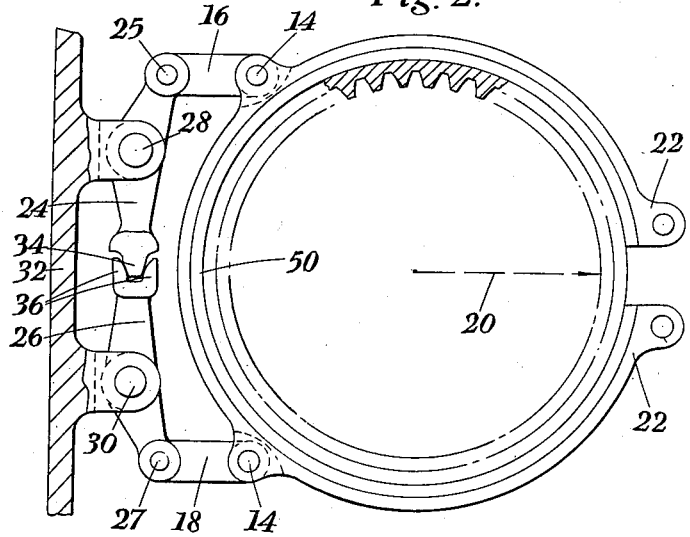
Figure 3:
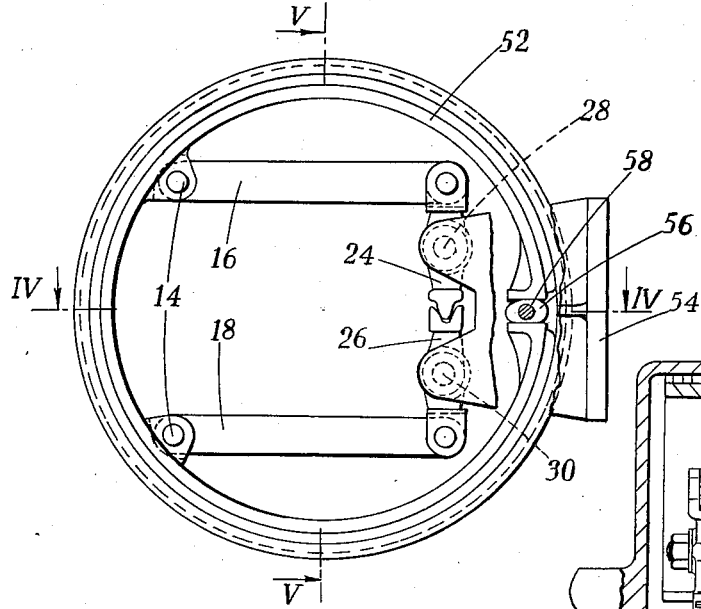
Figure 5:
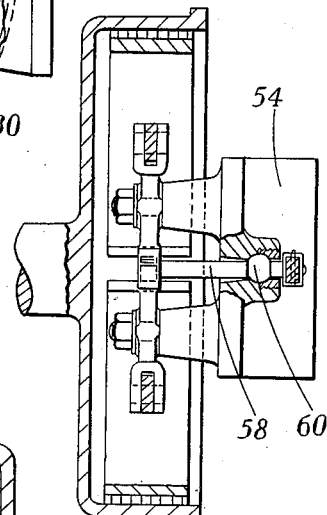
Figure 4:
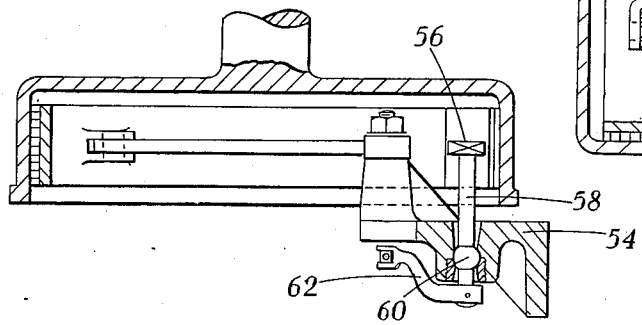

Referring to the accompanying drawings,

Figure 1 is a diagram illustrating means according to this invention for supporting an external brake-band surrounding one of the brake-drums of an epicyclic gearing, Figure 2 is a similar view of a modified construction, Figure 3 is a similar view of brake-supporting mechanism as applied to an internal brake-band, Figure 4 is a plan of Figure 3 in section along the line IV—IV in that figure, Figure 5 is a side elevation in section along the line V—V in Figure 3, Figures 6, 7 and 8 are views similar to Figure 2 of further modified constructions, Figures 9 and 10 are views similar to Figure 3 showing alternative forms of supporting means for an internal brake-band, and Figures 11 and 12 are diagrams illustrating the arrangement of Figure 10 as applied to an external brake-band.

Referring first to Figure 1, a flexible brake-band 10 which encircles nearly the whole of the circumference of a brake-drum 12 is connected at points 14 at opposite ends of a diameter to links 16, 18. The line joining the points 14 is perpendicular to the radius 20 passing midway between the free ends 22 of the band. The links 16, 18 extend in a direction away from the free ends 22 and are connected respectively to balance levers 24, 26 pivoted at 28, 30 respectively to lugs provided on the casing 32 of the gear-box. The arrangement is such that the links 16, 18 are parallel and the levers 24, 26 are in line with one another. The lever 24 is formed as a single gear tooth 34 at the end remote from its connection with the link 16, and the lever 26 is formed with two gear teeth 36 at its corresponding end which mesh with the tooth 34. The two arms of the lever 24 and of the lever 26 are, in this embodiment, equal.

It will be appreciated that the links 16, 18 and balance levers 24, 26 afford no abutment for any force exerted by the brake-band through the two links in the same direction, because if there were any such force it would cause one balance lever to swing clockwise and the other anti-clockwise. If, however, the brake-band exerts a force in one direction upon one link and in the opposite direction upon the other link these two forces find a firm abutment in the two balance levers 24, 26 exactly as if the two links were anchored directly to fixed points. Thus, when the brake-band is tightened around the drum the tendency which it acquires to rotate with the drum is resisted by the links and balance levers, but provided that the means for drawing together the free ends of the brake-band do not of themselves exert any lateral thrust the tightening of the band will be incapable of causing any transverse thrust on the drum. It will also be clear that as the mechanism is symmetrical it will act in the same way whether the drum is rotating clockwise or anticlockwise.

Alternatively, a linkage such as is shown in Figure 1 may be employed. This linkage consists of two parallel levers 38, 40 connected to the ends 22 of the brake-band and extending parallel to the radius 20. At their outer ends these two levers are connected together by a link 42. At its mid-point the link 38 is connected by another link 44 to the casing of the gear-box, and the lever 40 at its mid-point is connected by a link 46 to an actuating arm 48. When the arm 48 is rocked clockwise the lever 40 is moved upwards thus exerting an upward force on the lower end of the brake-band, and through the link 42 and the abutment provided by the link 44 a similar force is exerted downwards on the upper end 22 of the brake-band. Thus, the brake-applying effort is divided equally between the two ends of the brake-band and no resultant radial thrust is exerted on the brake-drum because the links 44, 46 are free to move laterally and afford no abutment for any such thrust.

Referring now to Figure 2, the points 14, although still symmetrical with respect to the radius 20, are not diametrically opposite but are about 120° apart. The links 16 are consequently much shorter and the levers 24, 26 instead of being straight as in Figure 1 are slightly bent. When the parts are proportioned as shown in Figure 2 the links 16, 18 remain substantially parallel even after the linings of the brake-band have worn considerably. As wear occurs the points 14 move inwards along paths which are approximately arcs centered at the point 50 opposite to the free ends of the brake-band. It will be seen that the points 25, 27 will move as wear occurs in arcuate paths which are substantially parallel to the paths along which the points 14 move, and thus the links 16 and 18 remain substantially parallel.

Figures 3, 4 and 5 illustrate similar mechanism applied to an internal expanding brake-band 52. The links 16, 18 and the levers 24, 26 arranged exactly as in Figure 1, are housed inside the brake-band and the fulcra 28, 30 of the levers are carried by a bracket 54 which is supported externally to the brake-drum. The points 14 at which the links 16, 18 are connected to the brake-band 52 are not diametrically opposite to one another but are symmetrically disposed with reference to the free ends of the brake-band. The brake is, of course, applied by forcing apart the free ends of the band in such a way that they move equally and oppositely. Any convenient means may be employed for effecting this and in the drawings a cam 56 is shown for this purpose. This cam is carried by a spindle 58 mounted in a ball joint 60 and provided externally with an actuating arm 62. The ball joint 60 ensures that the torque in the spindle 58 will be divided equally between the two opposed ends of the band 52.

It will be evident that the advantage secured from the construction according to Figure 2 can also be obtained in the case of an internal brake-band. Thus, if the outer parts of the balance levers 24, 26 in this figure are bent towards the right then, as the brake-band wears, the points of attachment of the links 16, 18 to these levers will move apart approximately at the same rate that the opposite ends of the links move apart.

Figure 8:
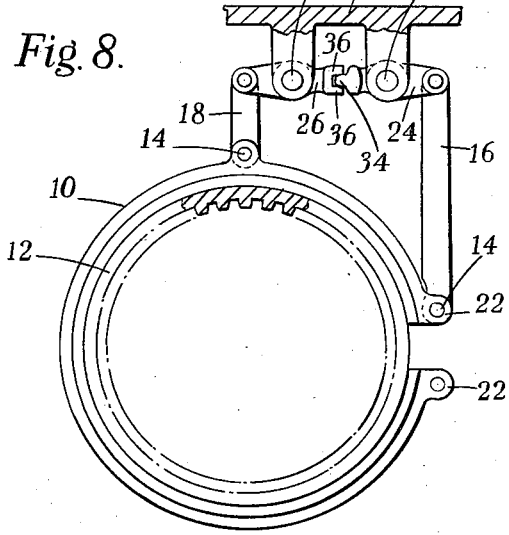

It will be appreciated that it is only for convenience in Figure 1 that the free ends of the band are on the side opposite to the levers 24, 26; they could be situated on the side next to these levers if desired analogous to the relative position illustrated in Figure 8.

It will also be appreciated that it is only for convenience in Figures 3 to 5 that the levers are arranged entirely within the brake-drum; they could, of course, be situated entirely or partly outside the drum.

In the arrangements so far described the links 16, 18 make equal angles with the radii passing through their points of attachment 14 to the brake-band. This condition, however, is not essential, and in Figures 6 and 7 modifications are shown in which the angles referred to are not equal. In the case of the link 16 the angle that it makes with the radius through its point of attachment 14 is 90°, while in the case of the link 18 the angle is zero—that is to say, the centre line of the link is radial to the brake-drum 12. The links 16, 18 are unequal in length in the form shown in Figure 6 and the balance levers 24', 26' are connected together by a link 23 which is parallel to the links 16, 18.

Figure 7:
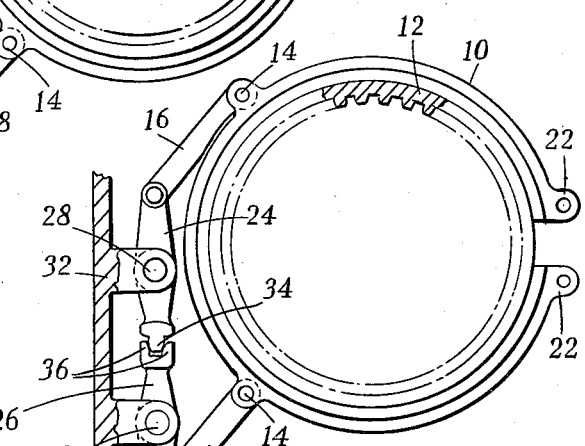

In Figure 7 the points 14 are rather more than 90° apart. The centre line of the link 18 is radial and the two links are, as in all the constructions so far described, parallel to one another. They are connected together by balance levers 24, 26 arranged exactly as in the construction shown in Figure 1.

Figure 6:
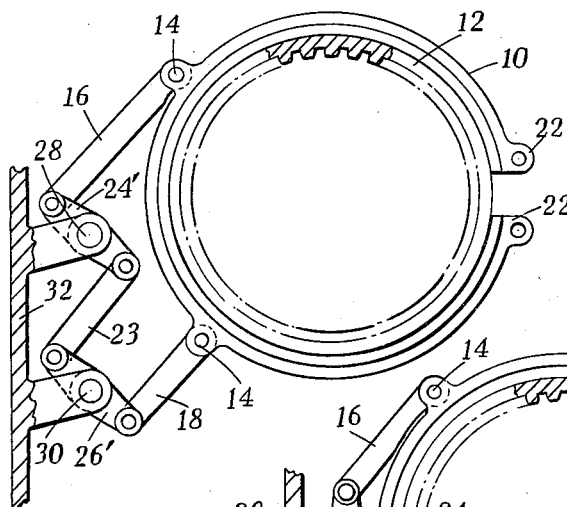

The unsymmetrical arrangements shown in Figures 6 and 7 operate in precisely the same way as the symmetrical arrangements first described. The balance levers being equal and the links being parallel, the compressive stress in one link caused by the braking torque will be exactly equal to the tensile stress in the other link. Whether or not the angles between the links and the radii aforesaid are equal, these two forces in the links will constitute a pure couple and, as is well known, the actual position of the forces of a pure couple in the plane thereof is immaterial. In Figure 6 it is clear that the link 18 can play no part in resisting the rotation of the brake-band; such rotation is prevented entirely by the link 16. The balance levers will, however, ensure that the radial link 18 will be subjected to a stress equal to that in the tangential link 16, and it is evident that this stress is exactly equal to and opposite in sense to the radial reaction on the drum 12 caused by the stress in the link 16. Similar considerations apply to the construction shown in Figure 7, notwithstanding that the centre line of the link 16 makes an angle less than 90° with the radius through the centre of the pivot 14.

When all the parts of the linkage are symmetrical about a diameter of the brake-drum passing between the free ends 22 of the brake-band, the braking effect is the same in whichever direction the drum rotates, as has already been stated. If there is asymmetry the braking effect will not be the same when the drum rotates in one direction as it is when the direction is in the opposite sense. Thus, in the arrangements described with reference to Figures 6 and 7 when the drum rotates clockwise the link 18 pushes the brake-band against the brake-drum, while when the rotation is anti-clockwise the tendency is for the linkage 18 to pull the brake-band away from the drum. If the arrangement is unsymmetrical in that the ends 22 of the brake-band are not midway between the points of support 14 there will also be a difference in braking effect as regards the sense of rotation. Referring to Figure 1, for example, if the drum is rotating clockwise the upper right-hand quadrant of the band is tending to wrap on to the drum, while the lower right-hand quadrant is tending to wrap off the drum. The upper of the two quadrants therefore exerts a greater braking effect than the lower quadrant. If the rotation is reversed it is the lower quadrant which exerts the greater effect. If, therefore, the ends 22 are displaced upwards to a position near to the upper point of attachment 14, an inequality will be introduced because the segment of the band between the lower point of attachment 14 and its end 22 will wrap on to the drum when the rotation is anti-clockwise, and will wrap off the drum when the rotation is clockwise, and this effect is not balanced by the corresponding upper segment owing to its shortness.

Figure 8 illustrates an arrangement in which one link is radial and the other link 16 is attached to one free end 22 of the band and extends tangentially. These links are connected together by balance levers 24, 26 similar to those shown in Figure 1. It will be seen that when the rotation of the drum is anticlockwise the part of the band from the point of attachment of the link 18 to the lower one of the two ends of the band, nearly 270° in extent, wraps on to the drum thereby making the brake self-energizing to a considerable extent, while when the rotation is clockwise the braking torque is less because the part of the band referred to tends to come away or unwrap from the drum.

Referring now to Figure 9, the internal brake-band 52 is provided with two lugs 64 diametrically opposite to one another, which lugs are slotted radially to receive rollers 66 carried by the free ends of two balance levers 24, 26 connected together by gear teeth 34, 36 as in Figures 1, 2, 3, 7 and 8. It will be apparent that this construction will operate in the same way as that shown in Figure 3, the connections constituted by the rollers 66 and the slots in the lugs 64 being mechanically equivalent to that provided by the links 16, 18. The lugs 64 need not be diametrically opposite points but if they are not in line with the slots in the two lugs must be in line with one another but can be positioned to the right or to the left of the position shown in Figure 9, as appears from the illustration in Figure 3 in which the balanced levers 24, 26, lie in a line outside the diametrical axis but in which the levers 16 and 18 are also attached to the brake band at points not diametrically opposite.

In Figure 10 the two links 16, 18 are attached to the internal brake-drum 52 at diametrically opposite points and they extend parallel to one another in opposite senses. Their free ends are pivoted to radius rods 68, 70 pivoted to fixed points 72, 74, and are connected together by a cross-link 76. This cross-link enables the two links 16, 18 to move in the direction of their length in the same sense but it prevents them from moving in opposite senses. Thus the linkage as a whole constitutes a balance mechanism which operates in the same way as those previously described.

In Figure 11 a similar mechanism is shown applied to an external brake-band 10, and the parts have the same reference numerals as in Figure 10. The cross-link 76 extends across the brake-drum and in some cases this is inconvenient or impossible. In such cases the analogous construction shown in Figure 12 may be employed. In this construction the radius rod 68' is disposed above the link 16 instead of below it, and both radius rods 68', 70' are provided with extensions 78, 80 forming angle levers to the free ends of which the cross-link 76 is pivoted. This cross-link, therefore, is wholly external to the brake-drum but it operates in precisely the same way as in the constructions of Figures 10 and 11 in that it resists lengthwise movement of the links 16, 18 in opposite senses but permits such movement in the same sense.

We claim:—

1. In a braking mechanism having a drum and a brake band, means to prevent rotative movement of the band with the drum, said means comprising a pair of supports, a pair of levers of constantly equal effective lengths and being operatively connected with each other, one end of one lever being connected to one of said supports and one end of the other lever being connected to the other support.

2. In a braking mechanism having a drum and a brake band, means to prevent rotative movement of the band with the drum, said means comprising a pair of supports, a pair of balance levers of constantly equal operative lengths and operatively connected to each other at one of their respective ends and connected to the band at their other ends.

3. In a braking mechanism having a drum and a brake band, means to prevent rotative movement of the band with the drum, said means comprising a pair of supports, a pair of alined levers pivoted intermediate their ends and having a gear tooth connection with each other, the free end of one lever being connected to one of said supports and the free end of the other lever being connected to the other support.

4. In a brake construction, a rotatable drum, friction brake means engageable therewith, operating means for causing the operative engagement of the brake means, against the drum, a pair of supports for supporting the brake means, and force transmitting linkage between said supports for transmitting lateral forces exerted on one of said supports due to the operative engagement of the brake means against the drum to another of said supports, said operating means comprising a pair of levers pivoted in proximity to the axis of the drum at a distance not in excess of one diameter of the drum from the axis of the drum, said levers being operatively connected to each other and to said supports.

5. In a braking mechanism having a drum and a brake band, means to prevent rotative movement of the band with the drum, said means comprising a pair of balance levers of equal fixed operative lengths and pivotally mounted intermediate their ends, said levers being operatively connected to each other, by a gear tooth connection, one end of each lever being connected to the band, the points of connection being a substantial distance apart.

6. In a brake construction, a rotatable drum, friction brake means engageable with the drum, a pair of supports for supporting the brake means, and force transmitting linkage between said supports for transmitting force exerted on one of said supports due to the operative engagement of the brake means against the drum to the other of said supports, said linkage comprising a pair of levers of constantly equal effective length and operatively connected, the end of one of said levers being connected to one of said supports and the end of the other lever being connected to the other support.

7. In a brake construction, a rotatable drum, friction brake means engageable with the drum, a pair of supports for supporting the brake means, and a mechanical linkage connecting said supports for transmitting force exerted on one of the supports due to the operative engagement of the brake means against the drum to the other of said supports, said linkage comprising a pair of levers of equal fixed effective lengths and operatively connected by a gear tooth connection, the end of one of said levers being connected to one of said supports and the end of the other lever being connected to the other support.

8. In a brake construction, a rotatable drum, friction brake means engageable with the drum, a pair of supports for supporting the brake means, and force transmitting linkage between said supports for transmitting force exerted on one of said supports due to the operative engagement of the brake means against the drum to the other of said supports, said linkage including a pair of links, one of which is directly connected to each of said supports, said links being relatively parallelly disposed and having their ends mounted for similar bodily displacement as wear of the brake means occurs whereby to keep said links parallel.

9. In a brake construction, a rotatable drum, a friction brake band having its ends relatively movable to cause engagement of the band against the drum, a pair of supports for supporting the brake band, and force transmitting linkage between said supports for transmitting lateral forces exerted on one of said supports due to the operative engagement of the brake means against the drum to the other of said supports, said linkage including a pair of links, one of which is directly connected to each of said supports, said links being relatively parallel and being asymmetrically disposed with respect to the ends of the band.

10. In a brake construction, a rotatable drum, friction brake means engageable with the drum, a pair of supports for supporting the brake means, and force transmitting linkage between said supports for transmitting force exerted on one of said supports due to the operative engagement of the brake means against the drum to the other of said supports, said linkage including a pair of links, one of which is directly connected to each of said supports, said links being relatively parallel, and each being disposed at a different angle with respect to the radial line passing through the axis of the drum and its support.

11. In a transmission of the planetary type having a rotary control drum, a continuous substantially circular brake band surrounding said drum and having adjacent ends positioned to one side of the transmission, means acting on said adjacent ends for contracting said band into braking engagement with said drum, and anchoring means for said band adapted to center the band with said drum during said braking engagement, said anchoring means including a pair of circumferentially spaced links pivoted to said band and extending laterally therefrom towards the side of said transmission opposite to that aforesaid, and means pivotally connecting the outer ends of said links, said connecting means being pivotally anchored to the transmission.

12. In a transmission of the planetary type having a rotary control drum, a continuous substantially circular brake band surrounding said drum and having adjacent ends positioned to one side of the transmission, means acting on said adjacent ends for contracting said band into braking engagement with said drum, anchoring means for said band adapted to center the band with said drum during said braking engagement, said anchoring means including a pair of circumferentially spaced links pivoted to said band and extending laterally therefrom towards the side of said transmission opposite to that aforesaid, and a pairs of levers respectively pivoted to the outer ends of said links, said levers being pivotally connected together and each being supported for pivoting movement by said transmission.

13. In a transmission having a rotary drum, braking means associated with said drum, means for actuating said braking means for braking said drum, anchoring means for said braking means, said anchoring means being located adjacent that circumferential half of the drum that is opposite said actuating means and including a pair of connected levers, means for pivotally mounting said levers, and means for connecting said levers to said braking means.

14. In a transmission having a rotary drum, braking means associated with said drum, means for actuating said braking means for braking said drum, anchoring means for said braking means, said anchoring means being located adjacent that circumferential half of the drum that is opposite said actuating means and including a pair of levers connected together at one end thereof, means for pivotally mounting said levers, and links respectively connecting the other ends of said levers with said braking means at circumferentially spaced points.

LAURENCE HENRY POMEROY.
ALBERT VERE OLIVER.